United States Patent
Zhu

(10) Patent No.: US 11,962,181 B2
(45) Date of Patent: Apr. 16, 2024

(54) DRIVE CIRCUIT OF ENERGY STORAGE POWER SUPPLY, AND ENERGY STORAGE POWER SUPPLY

(71) Applicant: Guangdong Aoyun Technology Co., Ltd., Huizhou (CN)

(72) Inventor: Xueping Zhu, Huizhou (CN)

(73) Assignee: Guangdong Aoyun Technology Co., Ltd., Huizhou (CN)

( * ) Notice: Subject to any disclaimer, the term of this patent is extended or adjusted under 35 U.S.C. 154(b) by 0 days.

(21) Appl. No.: 18/357,100

(22) Filed: Jul. 22, 2023

(65) Prior Publication Data
US 2023/0369875 A1 Nov. 16, 2023

(30) Foreign Application Priority Data
Jun. 20, 2023 (CN) .......................... 202321592809.9

(51) Int. Cl.
*H02J 7/00* (2006.01)
(52) U.S. Cl.
CPC ........ *H02J 7/00714* (2020.01); *H02J 7/0031* (2013.01); *H02J 7/0047* (2013.01)
(58) Field of Classification Search
USPC ................................................. 320/103, 137
See application file for complete search history.

(56) References Cited

U.S. PATENT DOCUMENTS

| 9,397,513 | B2* | 7/2016 | Butler | H02J 7/0068 |
| 10,446,885 | B2* | 10/2019 | Clarke | H01M 10/48 |
| 2012/0209547 | A1* | 8/2012 | Katsoulis | G01R 31/54 |
| | | | | 702/58 |
| 2014/0159509 | A1* | 6/2014 | Inskeep | H02J 7/342 |
| | | | | 307/150 |
| 2016/0013675 | A1 | 1/2016 | Workman et al. | |
| 2016/0028260 | A1 | 1/2016 | Workman et al. | |
| 2017/0170667 | A1 | 6/2017 | Chang et al. | |

OTHER PUBLICATIONS

J94674246 Machine Translation (Year: 2011).*

* cited by examiner

*Primary Examiner* — Samuel Berhanu
(74) *Attorney, Agent, or Firm* — Zhigang Ma

(57) ABSTRACT

The present disclosure discloses a drive circuit of an energy storage power supply and an energy storage power supply. The drive circuit of an energy storage power supply includes a charging control circuit, a first direct current output circuit, an alternating current output circuit and a main control circuit. The main control circuit can detect the load condition of the first direct current output circuit and the alternating current output circuit, and then the main control circuit controls the first direct current output circuit and the alternating current output circuit to be off. Thus, the problem of high power consumption when the alternating current output circuit and the first direct current output circuit in the energy storage power supply are in the no-load state is solved.

16 Claims, 10 Drawing Sheets

DRIVE CIRCUIT OF ENERGY STORAGE POWER SUPPLY, AND ENERGY STORAGE POWER SUPPLY

CROSS-REFERENCE TO RELATED APPLICATIONS

The application claims priority of Chinese patent application CN2023215928099, filed on 2023 Jun. 20, which is incorporated herein by reference in its entireties.

TECHNICAL FIELD

The present disclosure relates to the technical field of energy storage power supplies, and more particularly, to a drive circuit of an energy storage power supply, and an energy storage power supply.

BACKGROUND

At present, with the continuous progress of the society and technology, the use of electricity is increasingly popular. With the increasing enthusiasm for outdoor exploration, outdoor camping has a high demand for electricity. At this time, the emergence of an energy storage power supply can meet various demands for outdoor electricity. However, the current energy storage power supply has the problem of high power consumption, so it is necessary to propose an energy storage power supply with low power consumption.

SUMMARY

In view of this, the present disclosure provides a drive circuit of an energy storage power supply and an energy storage power supply, which can reduce the power consumption of the energy storage power supply.

The present disclosure discloses a drive circuit of an energy storage power supply, which includes a charging control circuit, a first direct current output circuit, an alternating current output circuit and a main control circuit.

As the improvement of the present disclosure, the charging control circuit configured to be electrically connected to an external power supply and a battery, so as to receive an external voltage to charge the battery. The first direct current output circuit electrically connected to the battery and configured to receive a voltage of the battery and output a first direct current voltage. The alternating current output circuit electrically connected to the battery and configured to receive the voltage of the battery and output an alternating current supply voltage. The main control circuit electrically connected to the battery, the charging control circuit, the first direct current output circuit, and an alternating current output circuit, and configured to control work of the charging control circuit, the first direct current output circuit, and the alternating current output circuit, and detect at least one of the first direct current output circuit and the alternating current output circuit to obtain a load condition of at least one of the first direct current output circuit and the alternating current output circuit, wherein when a duration during which the at least one of the first direct current output circuit and the alternating current output circuit is in a no-load condition exceeds a preset time value, the main control circuit controls the at least one of the first direct current output circuit and the alternating current output circuit to be off.

As the improvement of the present disclosure, the main control circuit is configured to detect the first direct current output circuit and the alternating current output circuit to obtain load conditions of the first direct current output circuit and the alternating current output circuit; the preset time value includes a first preset time value; when a duration during which the alternating current output circuit is in a no-load condition exceeds the first preset time value, the main control circuit controls the alternating current output circuit to be off; the preset time value includes a second preset time value; and when a duration during which the first direct current output circuit is in a no-load condition exceeds the second preset time value, the main control circuit controls the first direct current output circuit to be off.

As the improvement of the present disclosure, the drive circuit of the energy storage power supply further includes a second direct current output circuit; the second direct current output circuit is electrically connected to the battery, and is configured to: receive the voltage of the battery and output a second direct current voltage; the first direct current voltage is different from the second direct current voltage; the main control circuit is further configured to: control work of the second direct current output circuit and detect the second direct current output circuit to obtain a load condition of the second direct current output circuit; and when a duration during which the second direct current output circuit is in a no-load state exceeds a third preset time value, the main control circuit controls the second direct current output circuit to be off. As the improvement of the present disclosure, the alternating current output circuit is configured to: receive the voltage of the battery and convert the voltage of the battery into the alternating current output voltage; the first direct current output circuit is configured to: receive the voltage of the battery and convert the voltage of the battery into the first direct current voltage; the second direct current output circuit is configured to: receive the voltage of the battery and convert the voltage of the battery into the second direct current voltage.

As the improvement of the present disclosure, the alternating current output circuit includes an alternating current conversion module and an alternating current output port; the alternating current conversion module is configured to: receive the voltage of the battery and output the alternating current supply voltage; the alternating current output port is configured to output the alternating current supply voltage; the alternating current supply voltage is 110 V or 220 V; the first direct current output circuit includes a first direct current conversion module and a first direct current output port; the first direct current conversion module is configured to convert the voltage of the battery into the first direct current voltage; the first direct current output port is configured to output the first direct current voltage; the first direct current voltage is 5 V; the first direct current output port is a universal serial bus (USB) port; the second direct current output circuit includes a second direct current conversion module and a second direct current output port; the second direct current conversion module is configured to convert the voltage of the battery into the second direct current voltage; and the second direct current output port is configured to output the second direct current voltage; the second direct current voltage is 12 V.

As the improvement of the present disclosure, in one embodiment, the drive circuit of the energy storage power supply includes a first sampling circuit; the first sampling circuit is electrically connected to the main control circuit and the alternating current output circuit; the main control circuit detects the alternating current output circuit through the first sampling circuit and obtains a first sampling signal; the main control circuit obtains output power of the alternating current output circuit according to the first sampling signal; when the output power of the alternating current output circuit is less than a first preset power value, the alternating current output circuit is in a no-load state; and when a duration of the no-load state exceeds the first preset time value, the alternating current output circuit is controlled to be off;

As the improvement of the present disclosure, the drive circuit of the energy storage power supply includes a second sampling circuit; the second sampling circuit is electrically connected to the main control circuit and the first direct current output circuit; the main control circuit detects the first direct current output circuit through the second sampling circuit and obtains a second sampling signal; the main control circuit obtains output power of the first direct current output circuit according to the second sampling signal; when the output power of the first direct current output circuit is less than a second preset power value, the first direct current output circuit is in a no-load state; and when a duration of the no-load state exceeds the second preset time value, the first direct current output circuit is controlled to be off;

As the improvement of the present disclosure, the drive circuit of the energy storage power supply includes a third sampling circuit; the third sampling circuit is electrically connected to the main control circuit and the second direct current output circuit; the main control circuit detects the second direct current output circuit through the third sampling circuit and obtains a third sampling signal; the main control circuit obtains output power of the second direct current output circuit according to the third sampling signal; when the output power of the second direct current output circuit is less than a third preset power value, the second direct current output circuit is in a no-load state; and when a duration of the no-load state exceeds the third preset time value, the second direct current output circuit is controlled to be off.

As the improvement of the present disclosure, a quantity of the first direct current output port is plural, and a quantity of the second sampling circuit corresponds to the quantity of the first direct current output port; each second sampling circuit is connected between the corresponding first direct current output port and the main control circuit; the main control circuit is configured to detect load conditions of the plurality of first direct current output ports through the plurality of second sampling circuits; when any one of the first direct current output ports is in an on-load state, the main control circuit controls the first direct current output circuit to work normally; and when all the first direct current output ports are in the no-load state, the main control circuit controls the first direct current output circuit to be off.

As the improvement of the present disclosure, the first direct current output circuit further includes a first switch; the first switch includes a first control terminal, a first conductive terminal, and a first ground terminal; the main control circuit is electrically connected to the first control terminal; the first direct current conversion module and the first direct current output port are both electrically connected to the first conductive terminal; the first ground terminal is electrically connected to the ground; the first switch is configured to control conversion of the first direct current conversion module and outputting of the first direct current output port.

As the improvement of the present disclosure, the second sampling circuit includes a plurality of second sampling resistor groups; the main control circuit detects the first direct current output circuit through the second sampling resistor groups and obtains the second sampling signal; and the main control circuit is configured to control the first switch to be on or off according to the detected second sampling signal.

As the improvement of the present disclosure, the second direct current output circuit further includes a second switch; the second switch includes a second control terminal, a second conductive terminal, and a second ground terminal; the main control circuit is electrically connected to the second control terminal; the second direct current conversion module and the second direct current output port are both electrically connected to the second conductive terminal; the second ground terminal is electrically connected to the ground; the second switch is configured to control conversion of the second direct current conversion module and outputting of the second direct current output port.

As the improvement of the present disclosure, the third sampling circuit includes a third sampling resistor group; the main control circuit detects the second direct current output circuit through the third sampling resistor group and obtains the third sampling signal; and the main control circuit is configured to control the second switch to be on or off according to the detected third sampling signal.

As the improvement of the present disclosure, the alternating current output circuit further includes a third switch; the third switch includes a third control terminal, a third conductive terminal, and a third ground terminal; the main control circuit is electrically connected to the third control terminal; the alternating current conversion module and the alternating current output port are both electrically connected to the third conductive terminal; the third ground terminal is electrically connected to the ground; the third switch is configured to control conversion of the alternating current conversion module and outputting of the alternating current output port.

As the improvement of the present disclosure, the first sampling circuit includes a first sampling resistor group; the main control circuit detects the alternating current output circuit through the first sampling resistor group and obtains the first sampling signal; and the main control circuit is configured to control the third switch to be on or off according to the detected first sampling signal.

As the improvement of the present disclosure, the charging control circuit includes a first charging port, a first charging detection module, a second charging port, a second charging detection module, and a charging control module; the external voltage includes a first external voltage and a second external voltage; the first charging port is configured to receive the first external voltage; the first charging detection module is connected between the first charging port and the charging control module; the second charging port is configured to receive the second external voltage; the second charging detection module is connected between the second charging port and the charging control module; the charging control module is electrically connected to the main control circuit and the battery, and is configured to charge the battery through the first external voltage or the second direct current voltage; the first charging port is a direct current charging port; the first external voltage is 12 V; the second charging port is a Type-C charging port; and the second external voltage is 5 V.

As the improvement of the present disclosure, the drive circuit of the energy storage power supply further includes a lighting module; the lighting module is electrically connected to the main control circuit and is configured to emit light under the control of the main control circuit; the drive circuit of the energy storage power supply further includes an on/off control module; and the on/off control module is electrically connected to the main control circuit and is configured to be operated by a user to control on/off states of the drive circuit, the lighting module, the direct current output circuit, the alternating current output circuit, and the like.

As the improvement of the present disclosure, the drive circuit of the energy storage power supply further includes an indication module; and the indication module is electrically connected to the main control circuit and is configured to send an indication signal under the control of the main control circuit to indicate working states of the charging control module, the lighting module, the direct current output circuit, and the alternating current output circuit.

As the improvement of the present disclosure, the drive circuit of the energy storage power supply further includes a protection module; the protection module is electrically connected to the main control circuit and is configured to: detect a working state of the drive circuit and output a detection signal to the main control circuit; and the main control circuit analyzes, according to the detection signal, whether the drive circuit is in an abnormal working state, and controls, when the drive circuit is in the abnormal working state, the drive circuit to be off.

As the improvement of the present disclosure, the lighting module includes a fourth switch, a lighting conversion module, and a lighting device; the fourth switch includes a fourth control terminal, a fourth conductive terminal, and a fourth ground terminal; the main control circuit is electrically connected to the fourth control terminal; the lighting conversion module and the lighting device are both electrically connected to the fourth conductive terminal; the fourth ground terminal is electrically connected to the ground; and the fourth switch is configured to control conversion of the lighting conversion module and lighting of the lighting device.

As the improvement of the present disclosure, the on/off control module includes a first button, a second button, a third button, a fourth button, a fifth button, and a sixth button; the first button is configured to control an on/off state of the drive circuit; the second button is configured to control an on/off state of the first direct current output circuit; the third button is configured to control an on/off state of the second direct current output circuit; the fourth button is configured to control an on/off state of the alternating current output circuit; the fifth button is configured to control an on/off state of the lighting module; and the sixth button is configured to control an on/off state of the charging control circuit module.

The present disclosure also discloses an energy storage power supply, including the drive circuit of the energy storage power supply in any of the above embodiments and the battery.

Compared with the prior art, in the drive circuit of an energy storage power supply in the above embodiment, the main control circuit can detect at least one of the first direct current output circuit and the alternating current output circuit to obtain the load condition of at least one of the first direct current output circuit and the alternating current output circuit. When the duration during which the at least one of the first direct current output circuit and the alternating current output circuit is in the no-load condition exceeds the preset time value, the main control circuit controls the at least one of the first direct current output circuit and the alternating current output circuit to be off. Thus, the problem of high power consumption when the alternating current output circuit and the first direct current output circuit in the energy storage power supply are in the no-load state is solved. The main control circuit of the above energy storage power supply can accurately monitor and control the energy consumption of different modules, and a mechanical switch is canceled to achieve low-power operation, which prolongs the service life of the overall power supply and achieves a better use experience.

BRIEF DESCRIPTION OF THE DRAWINGS

In order to explain the technical solutions of the embodiments of the present disclosure more clearly, the following will briefly introduce the accompanying drawings used in the embodiments. Apparently, the drawings in the following description are only some embodiments of the present disclosure. Those of ordinary skill in the art can obtain other drawings based on these drawings without creative work.

DETAILED DESCRIPTION OF THE EMBODIMENTS

The accompanying drawings in the embodiment of the present disclosure are combined. The technical scheme in the embodiment of the present disclosure is clearly and completely described, Obviously, the described embodiment is only a part of the embodiment of the utility model, but not all embodiments are based on the embodiment of the utility model, and all other embodiments obtained by ordinary technicians in the field on the premise of not doing creative work belong to the protection range of the utility model.

In order to make the aims, technical solution and advantages of the present disclosure will be clearly, the present disclosure is further described below in combination with accompanying drawings and implementations.

It should be understood that although the terms first, second, third, etc. may be used to describe various kinds of information in the present disclosure, these information should not be limited to these terms. These terms are only used to distinguish the same type of information from each other.

Figure 1:
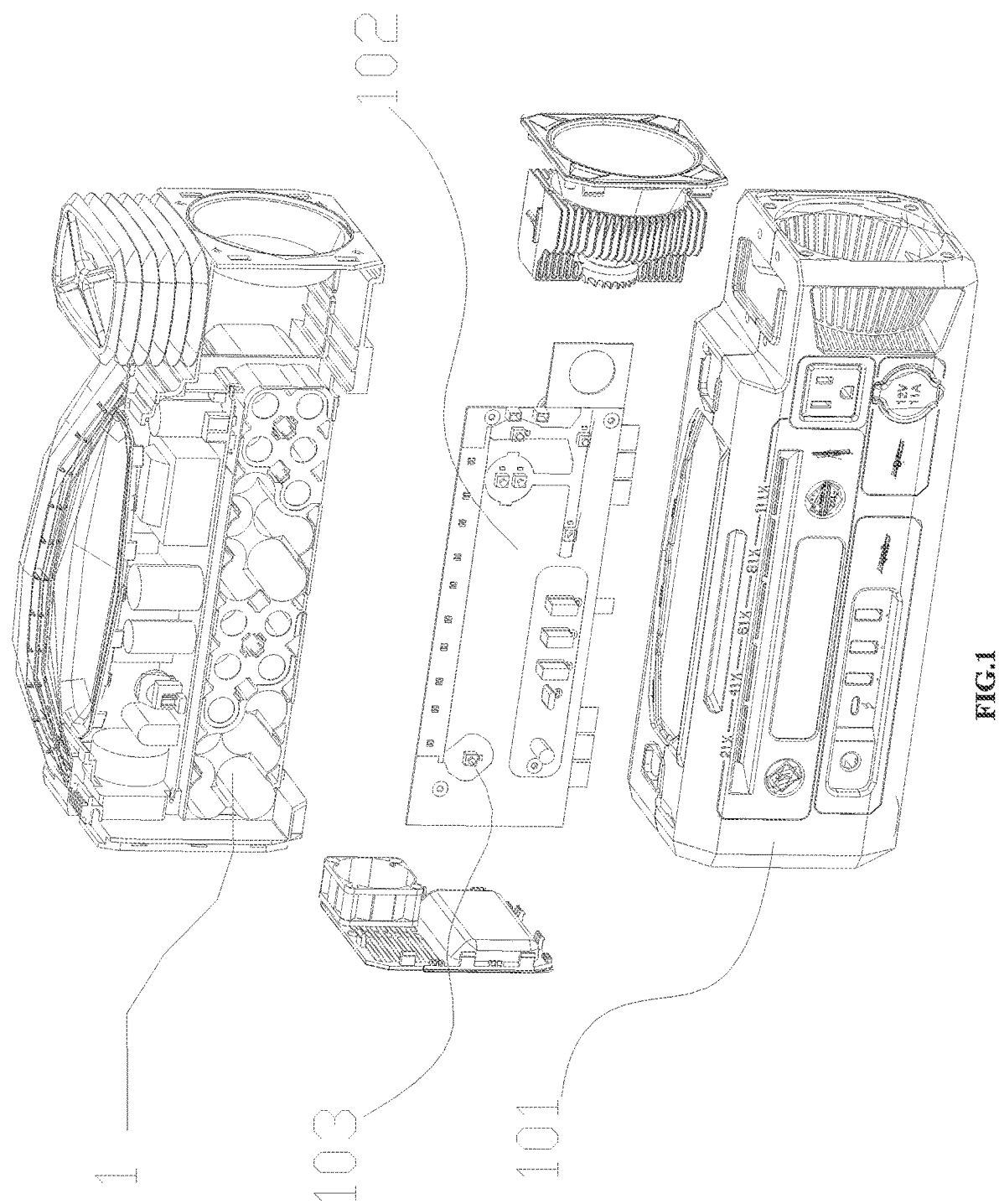
FIG. 1 is an exploded diagram of an energy storage power supply of the present disclosure.
Figure 2:
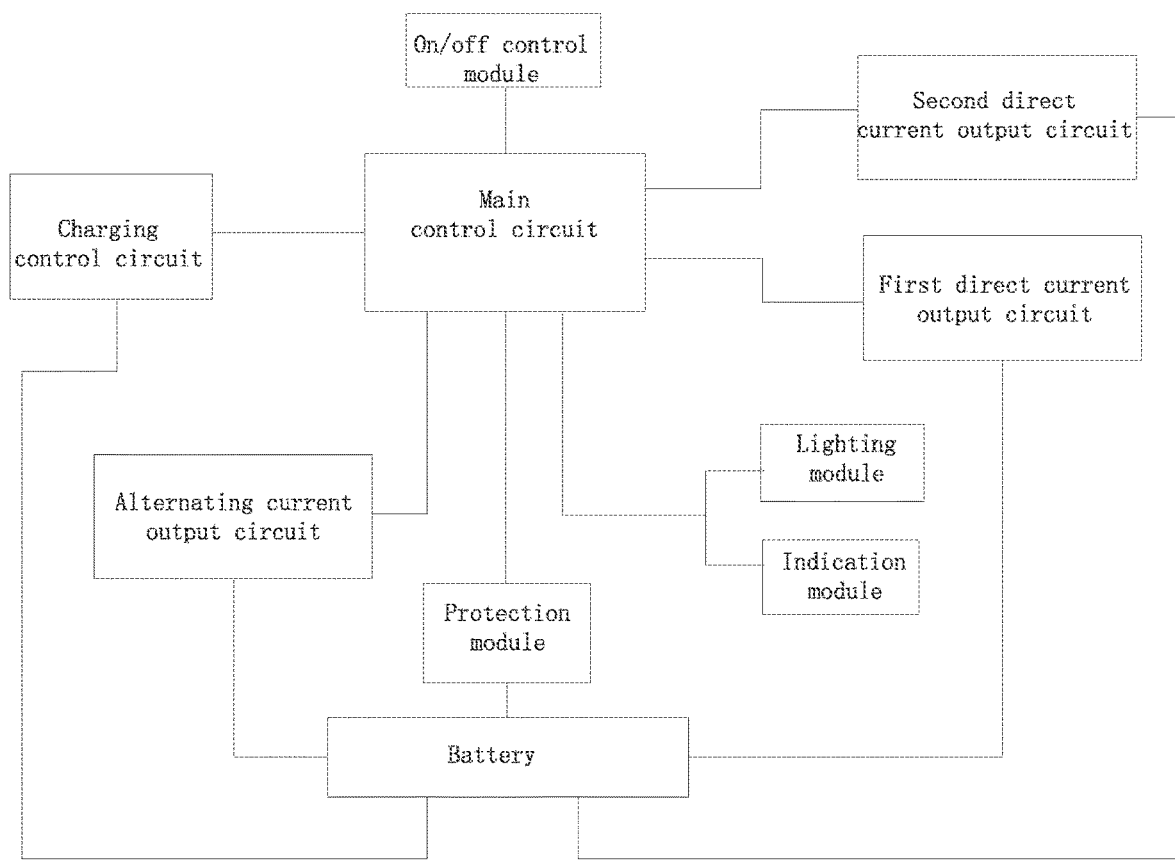
FIG. 2 is a systematic block diagram of the present disclosure.
Figure 3:
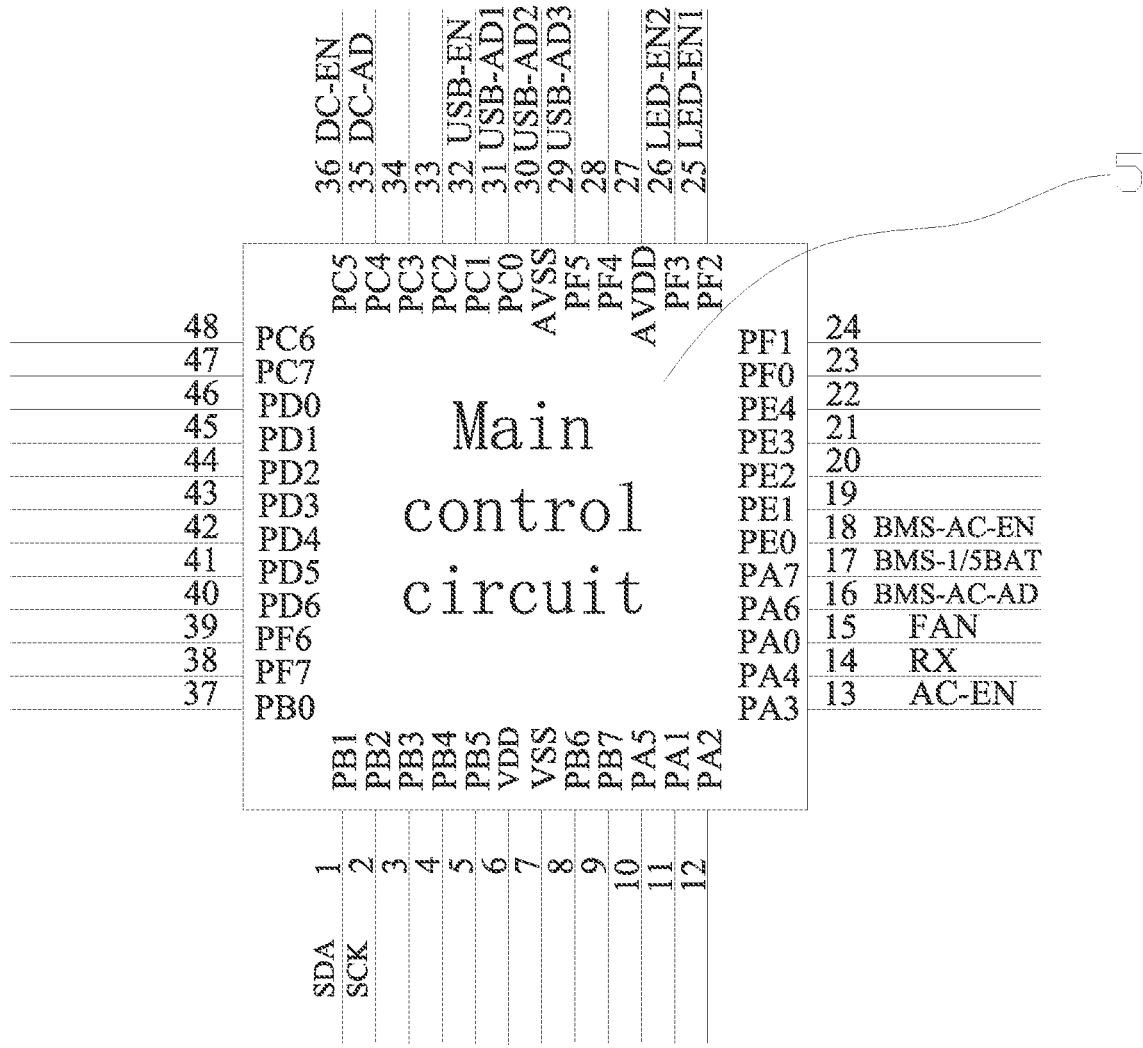
FIG. 3 is a circuit diagram of a main control circuit of the present disclosure.
Figure 4:
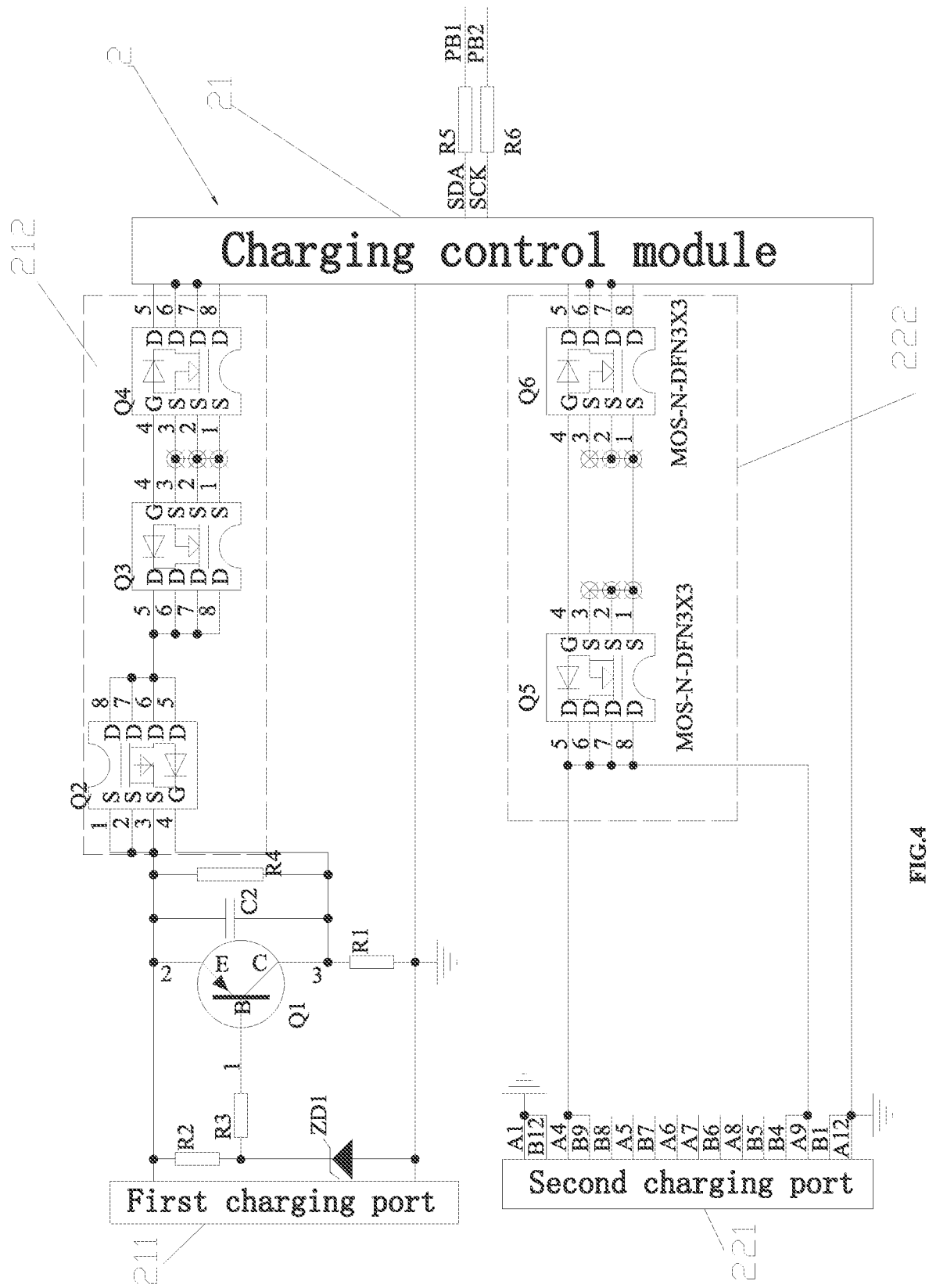
FIG. 4 is a circuit diagram of a charging control circuit of the present disclosure.
Figure 5:
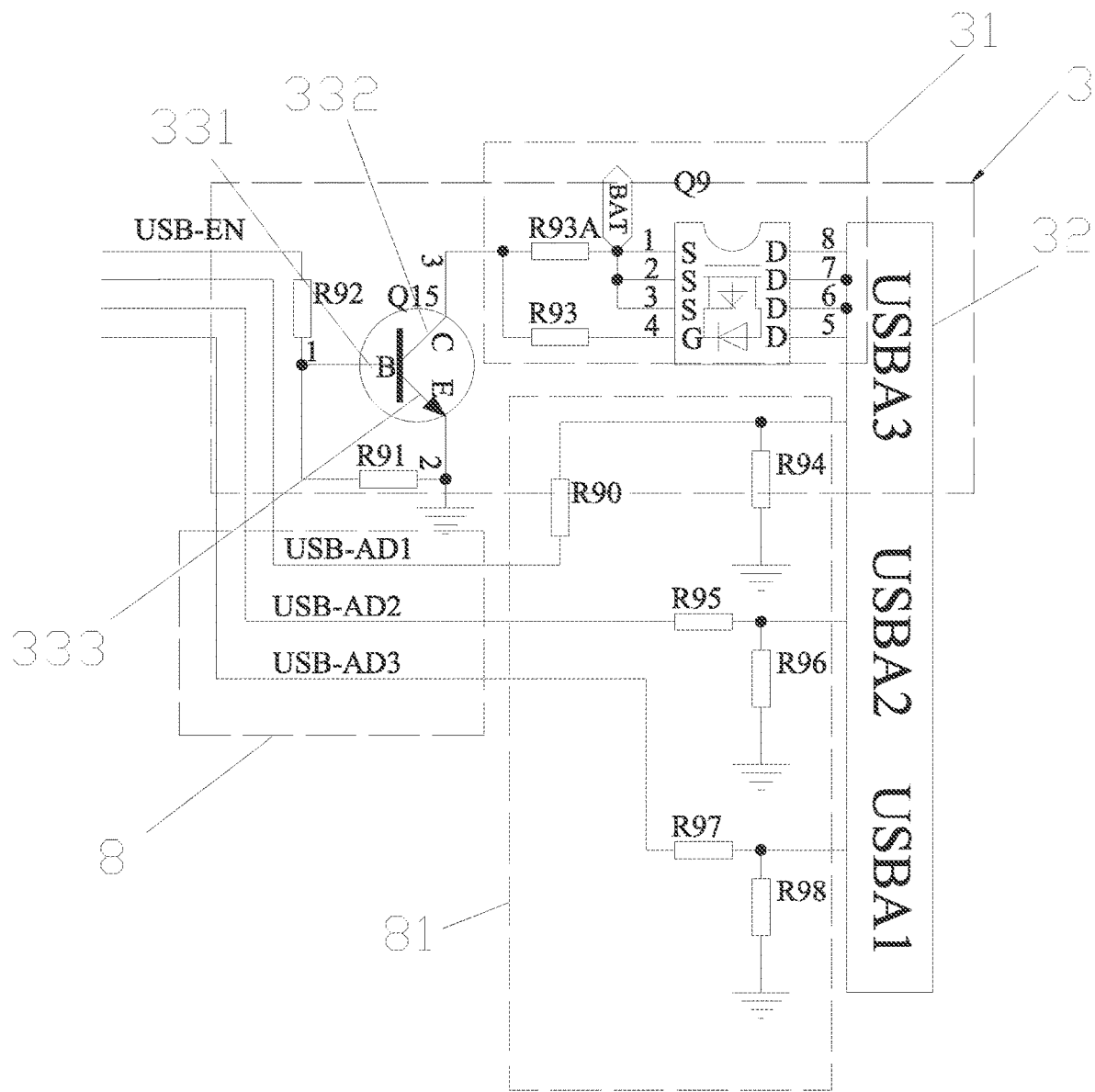
FIG. 5 is a circuit diagram of a first direct current output circuit of the present disclosure.
Figure 6:
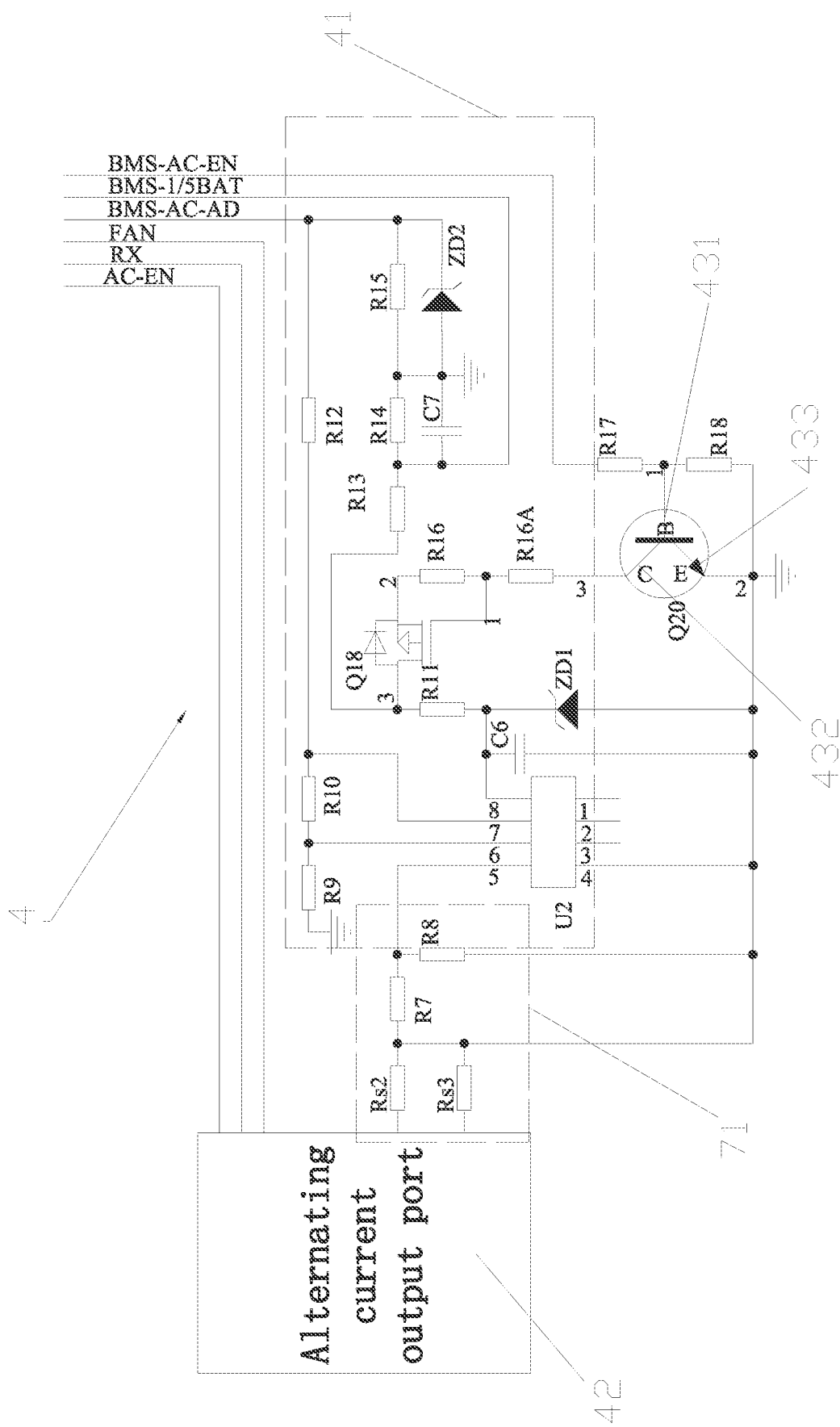
FIG. 6 is a circuit diagram of an alternating current output circuit of the present disclosure.
Figure 7:
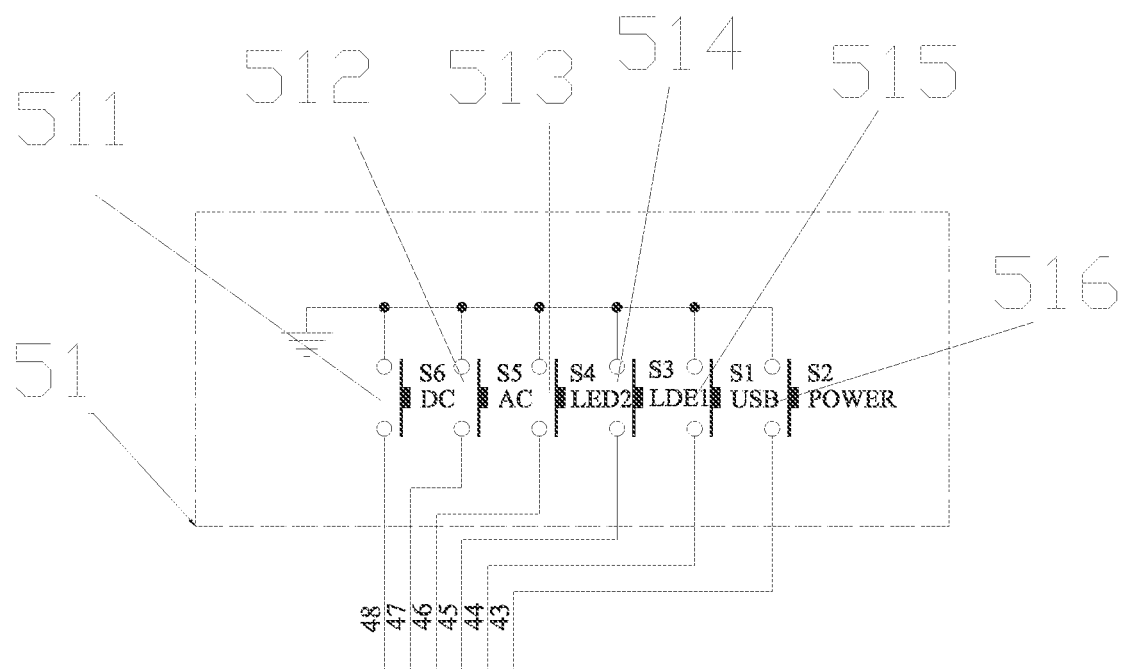
FIG. 7 is a circuit diagram of an on/off control module of the present disclosure.
Figure 8:
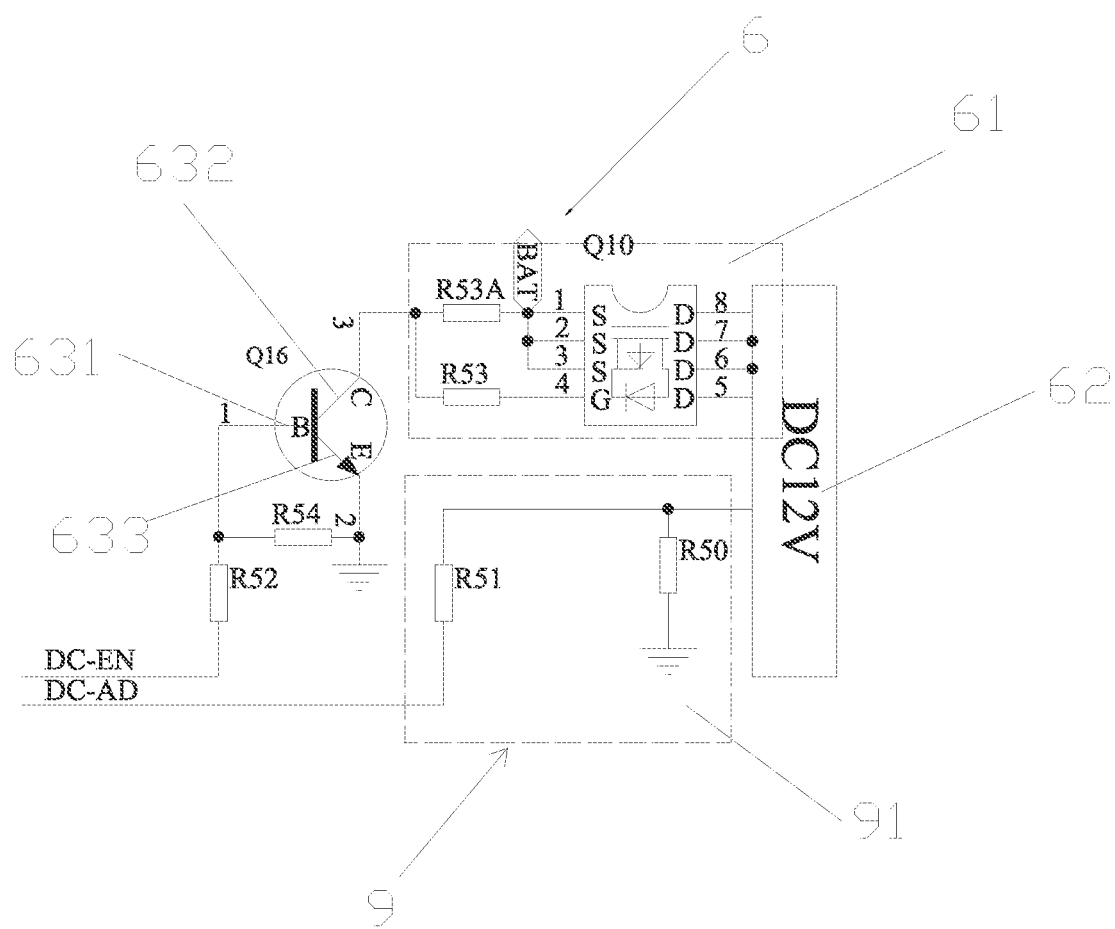
FIG. 8 is a circuit diagram of a second direct current output circuit of the present disclosure.
Figure 9:
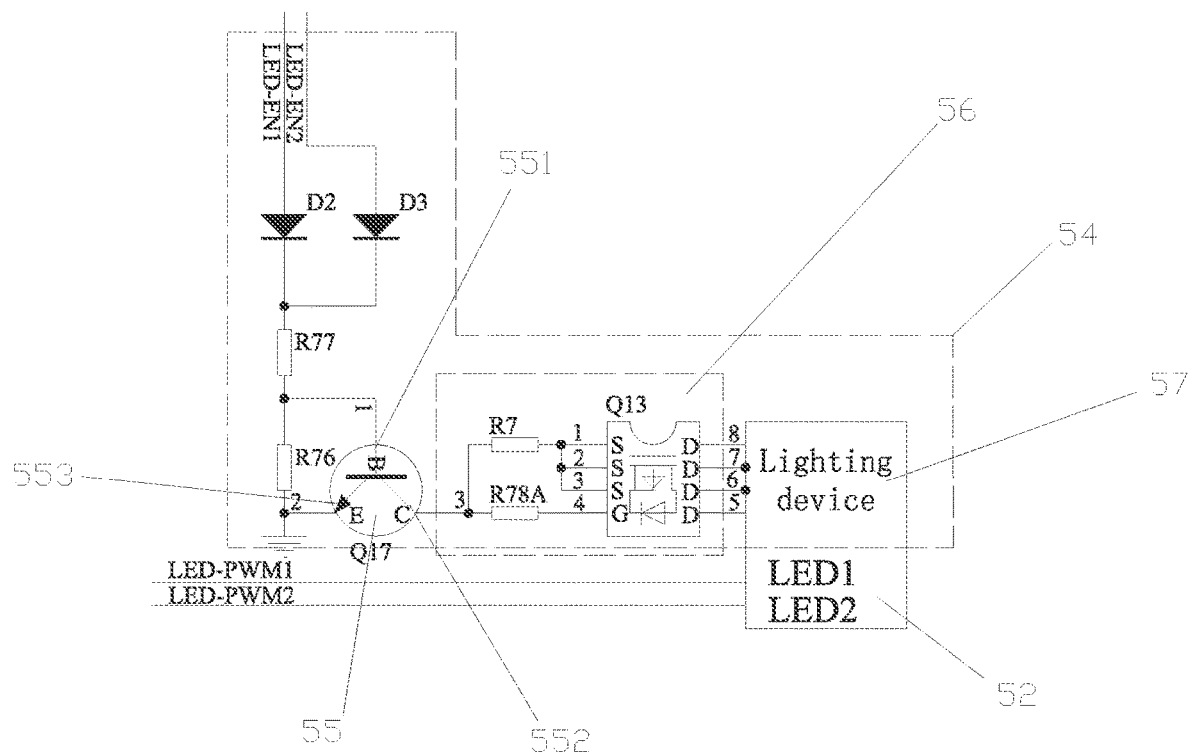
FIG. 9 is a circuit diagram of a lighting module of a drive circuit of the present disclosure
Figure 10:
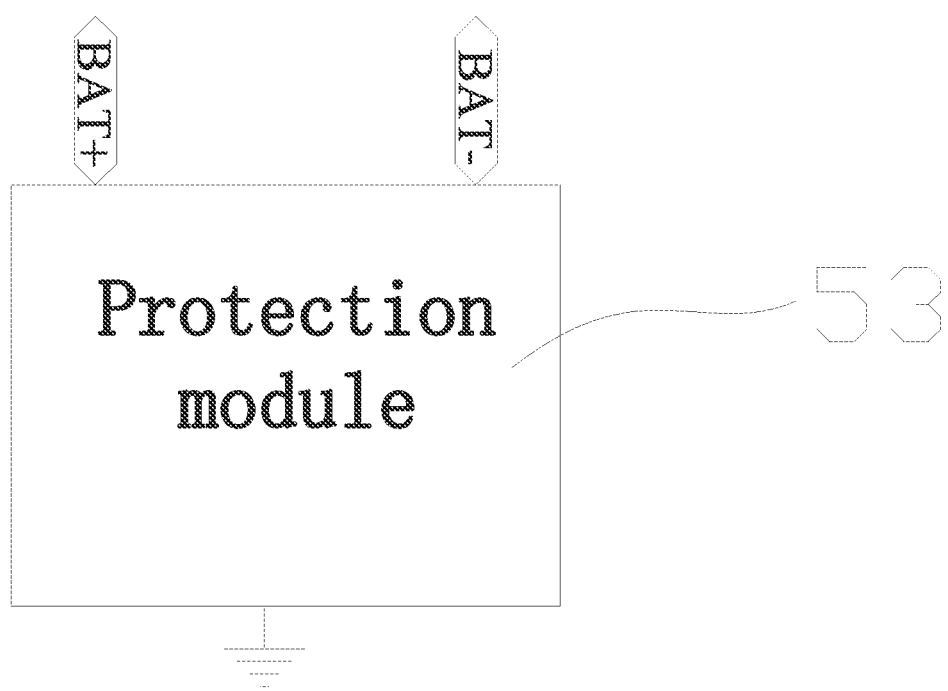
FIG. 10 is a circuit diagram of a protection module of a drive circuit of the present disclosure.

Referring to FIG. 1 to FIG. 13, the embodiments of the present disclosure provide an energy storage power supply. The energy storage power supply includes a drive circuit and a battery 1. The drive circuit includes a charging control circuit 2, a first direct current output circuit 3, an alternating current output circuit 4, and a main control circuit 5. It can be understood that the energy storage power supply can be a portable energy storage (PES), for example, "an outdoor portable power bank", which is used as a standby power supply or an emergency power supply including a shell 101, a battery 1 arranged in the shell, and at least one circuit board 102. At least part of the drive circuit can be arranged on the at least one circuit board 102. The shell 101 can be provided with an input/output port device, an on/off button 103, and the like which are electrically connected to the drive circuit.

In this embodiment, the battery 1 is configured to output a voltage of the battery 1. The charging control circuit 2 is configured to be electrically connected to an external power supply and the battery 1, so as to receive an external voltage to charge the battery 1. The first direct current output circuit 3 is electrically connected to the battery 1 and is configured to: receive the voltage of the battery 1 and output a first direct current voltage. The alternating current output circuit 4 is electrically connected to the battery 1 and is configured to: receive the voltage of the battery 1 and output an alternating current supply voltage. The main control circuit 5 is electrically connected to the battery 1, the charging control circuit 2, the first direct current output circuit 3, and an alternating current output circuit 4, and is configured to: control work of the charging control circuit 2, the first direct current output circuit 3, and the alternating current output circuit 4, and detect at least one of the first direct current output circuit 3 and the alternating current output circuit 4 to obtain a load condition of at least one of the first direct current output circuit 3 and the alternating current output circuit 4. When a duration during which the at least one of the first direct current output circuit 3 and the alternating current output circuit 4 is in a no-load condition exceeds a preset time value, the main control circuit 5 controls the at least one of the first direct current output circuit 3 and the alternating current output circuit 4 to be off. By means of the above structure, the main control circuit 5 can detect at least one of the first direct current output circuit 3 and the alternating current output circuit 4 to obtain the load condition of at least one of the first direct current output circuit 3 and the alternating current output circuit 4. When the duration during which the at least one of the first direct current output circuit 3 and the alternating current output circuit 4 is in the no-load condition exceeds the preset time value, the main control circuit 5 controls the at least one of the first direct current output circuit 3 and the alternating current output circuit 4 to be off. Thus, the problem of high power consumption when the alternating current output circuit 4 and the first direct current output circuit 3 in the energy storage power supply are in the no-load state is solved. The main control circuit of the above energy storage power supply can accurately monitor and control the energy consumption of different modules, and a mechanical switch is canceled to achieve low-power operation, which prolongs the service life of the overall power supply and achieves a better use experience.

In this embodiment, the main control circuit 5 is configured to detect the first direct current output circuit 3 and the alternating current output circuit 4 to obtain the load condition of the first direct current output circuit 3 and the load condition of the alternating current output circuit 4. The preset time value includes a first preset time value. When a duration during which the alternating current output circuit 4 is in a no-load condition exceeds the first preset time value, the main control circuit 5 controls the alternating current output circuit 4 to be off. The preset time value includes a second preset time value. When a duration during which the first direct current output circuit 3 is in a no-load condition exceeds the second preset time value, the main control circuit 5 controls the first direct current output circuit 3 to be off. The first preset time value may be 3 s, 4 s, or other time values. Specifically, when the duration during which the alternating current output circuit 4 is in the no-load state exceeds 3 s, the main control circuit 5 controls the alternating current output circuit 4 to be off, and the first preset time value may also be 4 s. Specifically, when the duration during which the alternating current output circuit 4 is in the no-load state exceeds 4 s, the main control circuit 5 controls the alternating current output circuit 4 to be off, and the second preset time value may also be 3 s, 4 s, or other time values. Specifically, when the duration during which the first direct current output circuit 3 is in the no-load state exceeds 3 s, the main control circuit 5 controls the first direct current output circuit 3 to be off, and the second preset time value may also be 4 s. Specifically, when the duration during which the first direct current output circuit 3 is in the no-load state exceeds 4 s, the main control circuit controls the first direct current output circuit 3 to be off. By means of the above structure, the preset time value can be reduced, so that the main control circuit 5 can quickly detect the load condition of the first direct current output circuit 3 and the load condition of the alternating current output circuit 4.

In this embodiment, the drive circuit of the energy storage power supply further includes a second direct current output circuit 6. The second direct current output circuit 6 is electrically connected to the battery 1, and is configured to: receive the voltage of the battery 1 and output a second direct current voltage. The first direct current voltage is different from the second direct current voltage. For example, the first direct current voltage and the second direct current voltage may be 5 V and 12 V. The main control circuit 5 is further configured to: control work of the second direct current output circuit 6 and detect the second direct current output circuit 6 to obtain a load condition of the direct current output circuit 6. When a duration during which the direct current output circuit 6 is in a no-load state exceeds a third preset time value, the main control circuit 5 controls the direct current output circuit 6 to be off. The third preset time value may be 3 s, 4 s, or other time values. Specifically, when the duration during which the second direct current output circuit 6 is in the no-load state exceeds 3 s, the main control circuit 5 controls the second direct current output circuit 6 to be off, and the third preset time value may also be 4 s. Specifically, when the duration during which the second direct current output circuit 6 is in the no-load state exceeds 4 s, the main control circuit 5 controls the second direct current output circuit 6 to be off. By means of the above structure, the preset time value can be reduced, so that the main control circuit 5 can quickly detect the load condition of the second direct current output circuit 6.

In this embodiment, the alternating current output circuit 4 is configured to: receive the voltage of the battery 1 and convert the voltage of the battery 1 into the alternating current output voltage. The first direct current output circuit 3 is configured to: receive the voltage of the battery 1 and convert the voltage of the battery 1 into the first direct current voltage. The second direct current output circuit 6 is configured to: receive the voltage of the battery 1 and convert the voltage of the battery 1 into the second direct current voltage.

In this embodiment, the alternating current output circuit 4 includes an alternating current conversion module 41 and an alternating current output port 42. The alternating current conversion module 41 is configured to: receive the voltage of the battery 1 and output the alternating current supply voltage. The alternating current output port 42 is configured to output the alternating current supply voltage. The alternating current supply voltage is 110 V or 220 V. The first direct current output circuit 3 includes a first direct current conversion module 31 and a first direct current output port 32. The first direct current conversion module 31 is configured to convert the voltage of the battery 1 into the first direct current voltage. The first direct current output port 32 is configured to output the first direct current voltage. The first direct current voltage is 5 V. The first direct current output port 32 is a universal serial bus (USB) port. The second direct current output circuit 6 includes a second direct current conversion module 61 and a second direct current output port 62. The second direct current conversion module 61 is configured to convert the voltage of the battery 1 into the second direct current voltage. The second direct current output port 62 is configured to output the second direct current voltage. The second direct current voltage is 12 V. By means of the above structure, the voltage of the battery 1 is 16 V. Specifically, the alternating current conversion module 41 receives the voltage of 16 V of the battery and converts the same into an alternating current voltage of 110 V or 220 V. Further, the alternating current voltage of 110 V or 220 V can be output by the alternating current output port 42. The alternating current voltage of 110 V is a standard voltage applicable to America, Canada, Mexico, and the like, and is applicable some low-power electric appliances such as a radio and a lamp. The alternating current voltage of 220 V is a standard voltage applicable to China, UK, France, and the like and is applicable to high-power electric appliances such as a washing machine and an air conditioner. The first direct current conversion module receives the voltage of 16 V of the battery and converts the same into a direct current voltage of 5 V. Further, the direct current voltage of 5 V can be output through the first direct current output port 32. The first direct current output port 32 is a USB port. Power transmission can be provided for electronic equipment such as a mobile phone, a mouse, and a keyboard through the USB port. The second direct current conversion module 61 receives the voltage of 16 V of the battery and converts the same into a direct current voltage of 12 V. Further, the direct current voltage of 12 V can be output through the second direct current output port 62. Power can be provided for some low-power electronic equipment such as a navigator and a charger.

In this embodiment, the drive circuit of the energy storage power supply includes a first sampling circuit 7. The first sampling circuit 7 is electrically connected to the main control circuit 5 and the alternating current output circuit 4. The main control circuit 5 detects the alternating current output circuit 4 through the first sampling circuit 7 and obtains a first sampling signal. The main control circuit 5 obtains output power of the alternating current output circuit 4 according to the first sampling signal. When the output power of the alternating current output circuit 4 is less than a first preset power value, the alternating current output circuit 4 is in a no-load state. When a duration of the no-load state exceeds the first preset time value, the alternating current output circuit 4 is controlled to be off. The first preset power value may be 50 W or other values. For example, when the first sampling circuit 7 obtains the first sampling signal by detecting the alternating current output circuit 4, the main control circuit 5 may obtain the output power of the alternating current output circuit 4 according to the first sampling signal. When the power of the alternating current output circuit 4 is less than 50 W, the alternating current output circuit 4 is in the no-load state. When a duration of the no-load state exceeds the first preset time value, the alternating current output circuit 4 is controlled to be off. By means of the above structure, the main control circuit 5 effectively controls the alternating current output circuit 4 to be off through the first sampling circuit 7.

In this embodiment, the drive circuit of the energy storage power supply includes a second sampling circuit 8. The second sampling circuit 8 is electrically connected to the main control circuit 5 and the first direct current output circuit 3. The main control circuit 5 detects the first direct current output circuit 3 through the second sampling circuit 8 and obtains a second sampling signal. The main control circuit 5 obtains output power of the first direct current output circuit 3 according to the second sampling signal. When the output power of the first direct current output circuit 3 is less than a second preset power value, the first direct current output circuit 3 is in a no-load state. When a duration of the no-load state exceeds the second preset time value, the first direct current output circuit 3 is controlled to be off. The second preset power value may be 10 W or other values. For example, when the second sampling circuit 8 obtains the second sampling signal by detecting the first direct current output circuit 3, the main control circuit 5 may obtain the output power of the first direct current output circuit 3 according to the second sampling signal. When the power of the first direct current output circuit 3 is less than 10 W, the first direct current output circuit 3 is in the no-load state. When a duration of the no-load state exceeds the second preset time value, the first direct current output circuit 3 is controlled to be off. By means of the above structure, the main control circuit 5 effectively controls the first direct current output circuit 3 to be off through the second sampling circuit.

In this embodiment, the drive circuit of the energy storage power supply includes a third sampling circuit 9. The third sampling circuit 9 is electrically connected to the main control circuit 5 and the second direct current output circuit 6. The main control circuit 5 detects the second direct current output circuit 6 through the third sampling circuit 9 and obtains a third sampling signal. The main control circuit 5 obtains output power of the second direct current output circuit 6 according to the third sampling signal. When the output power of the second direct current output circuit 6 is less than a first preset power value, the second direct current output circuit 6 is in a no-load state. When a duration of the no-load state exceeds the third preset time value, the second direct current output circuit 6 is controlled to be off. The third preset power value may be 15 W or other values. For example, when the third sampling circuit 9 obtains the third sampling signal by detecting the second direct current output circuit 6, the main control circuit 5 may obtain the output power of the second direct current output circuit 6 according to the third sampling signal. When the power of the second direct current output circuit 6 is less than 15 W, the second direct current output circuit 6 is in the no-load state. When a duration of the no-load state exceeds the second preset time value, the second direct current output circuit 6 is controlled to be off. By means of the above structure, the main control circuit 5 effectively controls the second direct current output circuit 6 to be off through the third sampling circuit 9.

In this embodiment, a quantity of the first direct current output port 32 is plural, and a quantity of the second sampling circuit 8 corresponds to the quantity of the first direct current output port 32. Each second sampling circuit 8 is connected between the corresponding first direct current output port 32 and the main control circuit 5. The main control circuit 5 is configured to detect load conditions of the plurality of first direct current output ports 32 through the plurality of second sampling circuits 8. When any one of the first direct current output ports 32 is in an on-load state, the main control circuit 5 controls the first direct current output circuit 3 to work normally; and when all the first direct current output ports 32 are in the no-load state, the main control circuit 5 controls the first direct current output circuit 3 to be off. There are three first direct current output ports 32. Further, the first direct current output ports 32 are USBA1, USBA2, and USBA3. Correspondingly, there are three second sampling circuits 8. The second sampling circuits 8 are USB-AD1, USB-AD2, and USB-AD3. Specifically, the USB-AD1 is connected between the USBA1 and the main control circuit; the USB-AD2 is connected between the USBA2 and the main control circuit; and the USB-AD3 is connected between the USBA3 and the main control circuit. When the USBA1 or USBA2 or USBA3 is in the on-load state, the main control circuit 5 controls the first direct current output circuit 3 to work normally. When the three output ports USBA1, USBA2, and USBA3 are in the no-load states at the same time, the main control circuit controls the first direct current output circuit 3 to be off. By means of the above structure, three USB output ports are provided, so that a plurality of devices can be simultaneously charged, which improves the charging efficiency and convenience. If any one of the USB output ports is in the on-load state, the first direct current output circuit 3 will work normally, which ensures the stability of the output ports.

In this embodiment, the first direct current output circuit 3 further includes a first switch 33. The first switch includes a first control terminal 331, a first conductive terminal 332, and a first ground terminal 333. The main control circuit 5 is electrically connected to the first control terminal 331. The first direct current conversion module 31 and the first direct current output port 32 are both electrically connected to the first conductive terminal 332. The first ground terminal 333 is electrically connected to the ground. The first switch 33 is configured to control conversion of the first direct current conversion module 31 and outputting of the first direct current output port 32. The first switch 33 is a first NPN-type triode. The first control terminal 331 may be configured to control on/off of a circuit in the main control circuit. The first conductive terminal 332 may be configured to output a current to the first direct current conversion module 31 and the first direct current output port 32. The first ground terminal 333 may be connected to the ground. By means of the above structure, the stability of the circuit can be improved.

In this embodiment, the second sampling circuit 8 includes a plurality of second sampling resistor groups 81. The main control circuit 5 detects the first direct current output circuit 3 through the second sampling resistor groups 81 and obtains the second sampling signal. The main control circuit 5 is configured to control the first switch 33 to be on or off according to the detected second sampling signal. There are three second sampling resistor groups 81, including a USBA1 sampling resistor group, a USBA2 sampling resistor group, and a USBA3 sampling resistor group. Further, the USBA1 sampling resistor group includes a resistor R1 and a resistor R2. The resistor R1 is connected to the main control circuit. The resistor R2 is connected to the ground. Both the resistor R1 and the resistor R2 are connected to the USBA1. The USBA2 sampling resistor group includes a resistor R3 and a resistor R4. The resistor R3 is connected to the main control circuit. The resistor R4 is connected to the ground. Both the resistor R3 and the resistor R4 are connected to the USBA2. The USBA3 sampling resistor group includes a resistor R5 and a resistor R6. The resistor R5 is connected to the main control circuit. The resistor R6 is connected to the ground. Both the resistor R5 and the resistor R6 are connected to the USBA3.

In this embodiment, the second direct current output circuit 6 further includes a second switch 63. The second switch includes a second control terminal 631, a second conductive terminal 632, and a second ground terminal 633. The main control circuit 5 is electrically connected to the second control terminal 631. The second direct current conversion module 61 and the second direct current output port 62 are both electrically connected to the second conductive terminal 632. The second ground terminal 633 is electrically connected to the ground. The second switch 63 is configured to control conversion of the second direct current conversion module 61 and outputting of the second direct current output port 62. The second switch 63 is a second NPN-type triode. The second control terminal 631 may be configured to control on/off of a circuit in the main control circuit 5. The second conductive terminal 632 may be configured to output a current to the second direct current conversion module 61 and the second direct current output port 62. The second ground terminal 633 may be connected to the ground. By means of the above structure, the stability of the circuit can be improved.

In this embodiment, the third sampling circuit 9 includes a third sampling resistor group 91. The main control circuit 5 detects the second direct current output circuit 6 through the third sampling resistor group 91 and obtains the third sampling signal. The main control circuit 5 is configured to control the second switch 63 to be on or off according to the detected third sampling signal. The third sampling resistor group 91 includes a resistor R7 and a resistor R8. The resistor R7 is connected to the main control circuit 5. The resistor R8 is connected to the ground. Both the resistor R7 and the resistor R8 are connected to the second direct current output port 62.

In this embodiment, the alternating current output circuit 4 further includes a third switch 43. The third switch 43 includes a third control terminal 431, a third conductive terminal 432, and a third ground terminal 433. The main control circuit 5 is electrically connected to the third control terminal 431. The alternating current conversion module 41 and the alternating current output port 42 are both electrically connected to the third conductive terminal 432. The third ground terminal 433 is electrically connected to the ground. The third switch 43 is configured to control conversion of the alternating current conversion module 41 and outputting of the alternating current output port 42. The third switch 43 is a third NPN-type transistor triode. The third control terminal 431 may be configured to control on/off of a circuit in the main control circuit 5. The third conductive terminal 432 may be configured to output a current to the alternating current conversion module 41 and the alternating current output port 42. The third ground terminal 433 may be connected to the ground. By means of the above structure, the stability of the circuit can be improved.

In this embodiment, the first sampling circuit 7 includes a first sampling resistor group 71. The main control circuit 5 detects the alternating current output circuit 4 through the first sampling resistor group 71 and obtains the first sampling signal. The main control circuit 5 is configured to control the third switch 43 to be on or off according to the detected first sampling signal.

In this embodiment, the charging control circuit 2 includes a first charging port 211, a first charging detection module 212, a second charging port 221, a second charging detection module 222, and a charging control module 21. The external voltage includes a first external voltage and a second external voltage. The first charging port 211 is configured to receive the first external voltage. The first charging detection module 212 is connected between the first charging port 211 and the charging control module 21. The second charging port 221 is configured to receive the second external voltage. The second charging detection module 221 is connected between the second charging port 221 and the charging control module 21. The charging control module 21 is electrically connected to the main control circuit 5 and the battery 1, and is configured to charge the battery 1 through the first external voltage or the second direct current voltage. The first charging port 211 is a direct current charging port. The first external voltage is 12 V. The second charging port 221 is a Type-C charging port. The second external voltage is 5 V. By means of the above structure, when the first charging port 211 receives the first external voltage of 12 V, the first charging detection module 212 detects inputting of the voltage and transmits the voltage to the charging control module 21, thus charging the battery 1. When the second charging port 221 receives the second external voltage of 5 V, the second charging detection module 222 detects inputting of the voltage and transmits the voltage to the charging control module 21, thus charging the battery. The existence of the charging detection module 222 effectively achieves the functions of detecting the input power and transmitting the same to the charging control module 21.

In this embodiment, the drive circuit of the energy storage power supply further includes a lighting module. The lighting module is electrically connected to the main control circuit 5 and is configured to emit light under the control of the main control circuit 5. The drive circuit of the energy storage power supply further includes an on/off control module 51. The on/off control module 51 is electrically connected to the main control circuit 5 and is configured to be operated by a user to control on/off states of the drive circuit, the lighting module, the direct current output circuit, the alternating current output circuit, and the like. The drive circuit of the energy storage power supply further includes an indication module 52. The indication module 52 is electrically connected to the main control circuit 5 and is configured to send an indication signal under the control of the main control circuit 5 to indicate working states of the charging control module, the lighting module, the direct current output circuit, and the alternating current output circuit. The drive circuit of the energy storage power supply further includes a protection module 53. The protection module is electrically connected to the main control circuit 5 and is configured to: detect a working state of the drive circuit and output a detection signal to the main control circuit 5. The main control circuit 5 analyzes, according to the detection signal, whether the drive circuit is in an abnormal working state, and controls, when the drive circuit is in the abnormal working state, the drive circuit to be off. By means of the above structure, the indication module 52 includes two indicator lamps LED1 and LED2. When the charging control module 21 is in a working state, the energy storage power supply is in a charging mode. At this time, the LED1 emits light. When the lighting module, the direct current output module, and the alternating current output module are in working states, the energy storage power supply is in a discharging mode. At this time, the LED2 emits light. The arrangement of the indicator lamps can visually indicate the working state of the energy storage power supply, which facilitates a user and an operator to understand running conditions. The protection module 53 is connected to positive and negative electrodes of the battery. When the drive circuit is over-voltage, over-current or over-temperature, the protection module 53 may control the drive circuit to be off to protect the energy storage power supply, which effectively protects the safety performance of the energy storage power supply and prolongs the service life of the energy storage power supply.

In this embodiment, the lighting module 54 includes a fourth switch 55, a lighting conversion module 56, and a lighting device 57. The fourth switch includes a fourth control terminal 551, a fourth conductive terminal 552, and a fourth ground terminal 553. The main control circuit 5 is electrically connected to the fourth control terminal 551. The lighting conversion module 56 and the lighting device 57 are both electrically connected to the fourth conductive terminal 552. The fourth ground terminal 553 is electrically connected to the ground. The fourth switch 55 is configured to control conversion of the lighting conversion module 56 and lighting of the lighting device 57. The fourth switch 55 is a fourth NPN-type transistor triode. The fourth control terminal 551 may be configured to control on/off of a circuit in the main control circuit 5. The fourth conductive terminal 552 may be configured to output a current to the lighting conversion module 56 and the lighting device 57. The fourth ground terminal 533 may be connected to the ground. By means of the above structure, the stability of the circuit can be improved.

In this embodiment, the on/off control module 51 includes a first button 511, a second button 512, a third button 513, a fourth button 514, a fifth button 515, and a sixth button 516. The first button 511 is configured to control an on/off state of the drive circuit. The second button 512 is configured to control an on/off state of the first direct current output circuit. The third button 513 is configured to control an on/off state of the second direct current output circuit. The fourth button 514 is configured to control an on/off state of the alternating current output circuit. The fifth button 515 is configured to control an on/off state of the lighting module. The sixth button 516 is configured to control an on/off state of the charging control circuit module 2. The first button 511 is connected to the main control circuit 5 to control on and off of the charging control circuit 2. The second button 512 is connected to the main control circuit 5 to control on and off of the alternating current output circuit 4. The third button 513 is connected to the main control circuit 5 to control on and off of the first direct current output circuit 3. The fourth button 514 is connected to the main control circuit 5 to control on and off of the second direct current output circuit 6. The fifth button 515 is connected to the main control circuit 5 to control on and off of the lighting module 54. The sixth button 516 is connected to the main control circuit 5 to control on and off of the indication module 52. By means of the above structure, all the modules of the energy storage power supply are provided with the corresponding on/off buttons, which facilitates quickly cutting off the power of the corresponding modules in emergencies and facilitates a user to control and manage each module.

One or more implementation modes are provided above in combination with specific contents, and it is not deemed that the specific implementation of the present disclosure is limited to these specifications. Any technical deductions or replacements approximate or similar to the method and structure of the present disclosure or made under the concept of the present disclosure shall fall within the scope of protection of the present disclosure.

What is claimed is:

1. A drive circuit of an energy storage power supply, wherein the drive circuit of the energy storage power supply comprises:
a charging control circuit, configured to be electrically connected to an external power supply and a battery, so as to receive an external voltage to charge the battery;
a first direct current output circuit, electrically connected to
the battery and configured to receive a voltage of the battery and output a first direct current voltage;
an alternating current output circuit, electrically connected to the battery and configured to receive the voltage of the battery and output an alternating current supply voltage; and
a main control circuit, electrically connected to the battery, the charging control circuit, the first direct current output circuit, and an alternating current output circuit, and configured to: control work of the charging control circuit, the first direct current output circuit, and the alternating current output circuit, and detect at least one of the first direct current output circuit and the alternating current output circuit to obtain a load condition of at least one of the first direct current output circuit and the alternating current output circuit, wherein when a duration during which the at least one of the first direct current output circuit and the alternating current output circuit is in a no-load condition exceeds a preset time value, the main control circuit controls the at least one of the first direct current output circuit and the alternating current output circuit to be off,
wherein the main control circuit is configured to detect the first direct current output circuit and the alternating current output circuit to obtain load conditions of the first direct current output circuit and the alternating current output circuit; the preset time value comprises a first preset time value; when a duration during which the alternating current output circuit is in a no-load condition exceeds the first preset time value, the main control circuit controls the alternating current output circuit to be off; the preset time value comprises a second preset time value; and when a duration during which the first direct current output circuit is in a no-load condition exceeds the second preset time value, the main control circuit controls the first direct current output circuit to be off.

2. The drive circuit of the energy storage power supply according to claim 1, wherein the drive circuit of the energy storage power supply further comprises a second direct current output circuit; the second direct current output circuit is electrically connected to the battery, and is configured to: receive the voltage of the battery and output a second direct current voltage; the first direct current voltage is different from the second direct current voltage; the main control circuit is further configured to: control work of the second direct current output circuit and detect the second direct current output circuit to obtain a load condition of the second direct current output circuit; and when a duration during which the second direct current output circuit is in a no-load state exceeds a third preset time value, the main control circuit controls the second direct current output circuit to be off.

3. The drive circuit of the energy storage power supply according to claim 1, wherein the alternating current output circuit is configured to: receive the voltage of the battery and convert the voltage of the battery into the alternating current output voltage; the first direct current output circuit is configured to: receive the voltage of the battery and convert the voltage of the battery into the first direct current voltage; the second direct current output circuit is configured to: receive the voltage of the battery and convert the voltage of the battery into the second direct current voltage;
the alternating current output circuit comprises an alternating current conversion module and an alternating current output port; the alternating current conversion module is configured to: receive the voltage of the battery and output the alternating current supply voltage; the alternating current output port is configured to output the alternating current supply voltage; the first direct current output circuit comprises a first direct current conversion module and a first direct current output port; the first direct current conversion module is configured to convert the voltage of the battery into the first direct current voltage; the first direct current output port is configured to output the first direct current voltage; the second direct current output circuit comprises a second direct current conversion module and a second direct current output port; the second direct current conversion module is configured to convert the voltage of the battery into the second direct current voltage; and the second direct current output port is configured to output the second direct current voltage.

4. The drive circuit of the energy storage power supply according to claim 3, wherein the alternating current supply voltage is 110 V or 220 V; the first direct current voltage is 5 V; and the second direct current voltage is 12 V.

5. The drive circuit of the energy storage power supply according to claim 3, wherein the drive circuit of the energy storage power supply comprises a first sampling circuit; the first sampling circuit is electrically connected to the main control circuit and the alternating current output circuit; the main control circuit detects the alternating current output circuit through the first sampling circuit and obtains a first sampling signal; the main control circuit obtains output power of the alternating current output circuit according to the first sampling signal; when the output power of the alternating current output circuit is less than a first preset power value, the alternating current output circuit is in a no-load state; and when a duration of the no-load state exceeds the first preset time value, the alternating current output circuit is controlled to be off;
the drive circuit of the energy storage power supply comprises a second sampling circuit; the second sampling circuit is electrically connected to the main control circuit and the first direct current output circuit; the main control circuit detects the first direct current output circuit through the second sampling circuit and obtains a second sampling signal; the main control circuit obtains output power of the first direct current output circuit according to the second sampling signal; when the output power of the first direct current output circuit is less than a second preset power value, the first direct current output circuit is in a no-load state; and when a duration of the no-load state exceeds the second preset time value, the first direct current output circuit is controlled to be off;
the drive circuit of the energy storage power supply comprises a third sampling circuit; the third sampling circuit is electrically connected to the main control circuit and the second direct current output circuit; the main control circuit detects the second direct current output circuit through the third sampling circuit and obtains a third sampling signal; the main control circuit obtains output power of the second direct current output circuit according to the third sampling signal; when the output power of the second direct current output circuit is less than a third preset power value, the second direct current output circuit is in a no-load state; and when a duration of the no-load state exceeds the third preset time value, the second direct current output circuit is controlled to be off.

6. The drive circuit of the energy storage power supply according to claim 5, wherein a quantity of the first direct current output port is plural, and a quantity of the second sampling circuit corresponds to the quantity of the first direct current output port; each second sampling circuit is connected between the corresponding first direct current output port and the main control circuit; the main control circuit is configured to detect load conditions of the plurality of first direct current output ports through the plurality of second sampling circuits; when any one of the first direct current output ports is in an on-load state, the main control circuit controls the first direct current output circuit to work normally; and when all the first direct current output ports are in the no-load state, the main control circuit controls the first direct current output circuit to be off.

7. The drive circuit of the energy storage power supply according to claim 5, wherein the first direct current output circuit further comprises a first switch; the first switch comprises a first control terminal, a first conductive terminal, and a first ground terminal; the main control circuit is electrically connected to the first control terminal; the first direct current conversion module and the first direct current output port are both electrically connected to the first conductive terminal; the first ground terminal is electrically connected to the ground; the first switch is configured to control conversion of the first direct current conversion module and outputting of the first direct current output port;

the second sampling circuit comprises a plurality of second sampling resistor groups; the main control circuit detects the first direct current output circuit through the second sampling resistor groups and obtains the second sampling signal; and the main control circuit is configured to control the first switch to be on or off according to the detected second sampling signal.

8. The drive circuit of the energy storage power supply according to claim 5, wherein the second direct current output circuit further comprises a second switch; the second switch comprises a second control terminal, a second conductive terminal, and a second ground terminal; the main control circuit is electrically connected to the second control terminal; the second direct current conversion module and the second direct current output port are both electrically connected to the second conductive terminal; the second ground terminal is electrically connected to the ground; the second switch is configured to control conversion of the second direct current conversion module and outputting of the second direct current output port;

the third sampling circuit comprises a third sampling resistor group; the main control circuit detects the second direct current output circuit through the third sampling resistor group and obtains the third sampling signal; and the main control circuit is configured to control the second switch to be on or off according to the detected third sampling signal.

9. The drive circuit of the energy storage power supply according to claim 5, wherein the alternating current output circuit further comprises a third switch; the third switch comprises a third control terminal, a third conductive terminal, and a third ground terminal; the main control circuit is electrically connected to the third control terminal; the alternating current conversion module and the alternating current output port are both electrically connected to the third conductive terminal; the third ground terminal is electrically connected to the ground; the third switch is configured to control conversion of the alternating current conversion module and outputting of the alternating current output port;

the first sampling circuit comprises a first sampling resistor group; the main control circuit detects the alternating current output circuit through the first sampling resistor group and obtains the first sampling signal; and the main control circuit is configured to control the third switch to be on or off according to the detected first sampling signal.

10. The drive circuit of the energy storage power supply according to claim 2, wherein the charging control circuit comprises a first charging port, a first charging detection module, a second charging port, a second charging detection module, and a charging control module; the external voltage comprises a first external voltage and a second external voltage; the first charging port is configured to receive the first external voltage; the first charging detection module is connected between the first charging port and the charging control module; the second charging port is configured to receive the second external voltage; the second charging detection module is connected between the second charging port and the charging control module; the charging control module is electrically connected to the main control circuit and the battery, and is configured to charge the battery through the first external voltage or the second direct current voltage; the first charging port is a direct current charging port; the first external voltage is 12 V; the second charging port is a Type-C charging port; and the second external voltage is 5 V.

11. A drive circuit of an energy storage power supply, wherein the drive circuit of the energy storage power supply comprises:
a charging control circuit, configured to be electrically connected to an external power supply and a battery, so as to receive an external voltage to charge the battery;
a first direct current output circuit, electrically connected to
the battery and configured to receive a voltage of the battery and output a first direct current voltage;
an alternating current output circuit, electrically connected to the battery and configured to receive the voltage of the battery and output an alternating current supply voltage; and
a main control circuit, electrically connected to the battery, the charging control circuit, the first direct current output circuit, and an alternating current output circuit, and configured to: control work of the charging control circuit, the first direct current output circuit, and the alternating current output circuit, and detect at least one of the first direct current output circuit and the alternating current output circuit to obtain a load condition of at least one of the first direct current output circuit and the alternating current output circuit, wherein when a duration during which the at least one of the first direct current output circuit and the alternating current output circuit is in a no-load condition exceeds a preset time value, the main control circuit controls the at least one of the first direct current output circuit and the alternating current output circuit to be off;

wherein the drive circuit of the energy storage power supply further comprises a lighting module; the lighting module is electrically connected to the main control circuit and is configured to emit light under the control of the main control circuit; the drive circuit of the energy storage power supply further comprises an on/off control module; and the on/off control module is electrically connected to the main control circuit and is configured to be operated by a user to control on/off states of the drive circuit, the lighting module, the direct current output circuit, the alternating current output circuit, and the like.

12. The drive circuit of the energy storage power supply according to claim 11, wherein the drive circuit of the energy storage power supply further comprises an indication module; and the indication module is electrically connected to the main control circuit and is configured to send an indication signal under the control of the main control circuit to indicate working states of the charging control module, the lighting module, the direct current output circuit, and the alternating current output circuit.

13. The drive circuit of the energy storage power supply according to claim 11, wherein the drive circuit of the energy storage power supply further comprises a protection module; the protection module is electrically connected to the main control circuit and is configured to: detect a working state of the drive circuit and output a detection signal to the main control circuit; and the main control circuit analyzes, according to the detection signal, whether the drive circuit is in an abnormal working state, and controls, when the drive circuit is in the abnormal working state, the drive circuit to be off.

14. The drive circuit of the energy storage power supply according to claim 11, wherein the lighting module comprises a fourth switch, a lighting conversion module, and a lighting device; the fourth switch comprises a fourth control terminal, a fourth conductive terminal, and a fourth ground terminal; the main control circuit is electrically connected to the fourth control terminal; the lighting conversion module and the lighting device are both electrically connected to the fourth conductive terminal; the fourth ground terminal is electrically connected to the ground; and the fourth switch is configured to control conversion of the lighting conversion module and lighting of the lighting device.

15. The drive circuit of the energy storage power supply according to claim 14, wherein the on/off control module comprises a first button, a second button, a third button, a fourth button, a fifth button, and a sixth button; the first button is configured to control an on/off state of the drive circuit; the second button is configured to control an on/off state of the first direct current output circuit; the third button is configured to control an on/off state of the second direct current output circuit; the fourth button is configured to control an on/off state of the alternating current output circuit; the fifth button is configured to control an on/off state of the lighting module; and the sixth button is configured to control an on/off state of the charging control circuit module.

16. An energy storage power supply, comprising the drive circuit of the energy storage power supply according to claim 1 and the battery;

wherein the charging control circuit comprises a first charging port, a first charging detection module, a second charging port, a second charging detection module, and a charging control module; the external voltage comprises a first external voltage and a second external voltage; the first charging port is configured to receive the first external voltage; the first charging detection module is connected between the first charging port and the charging control module; the second charging port is configured to receive the second external voltage; the second charging detection module is connected between the second charging port and the charging control module; the charging control module is electrically connected to the main control circuit and the battery, and is configured to charge the battery through the first external voltage or the second direct current voltage.

\* \* \* \* \*